(12) United States Patent
Tsai et al.

(10) Patent No.: US 7,567,785 B2
(45) Date of Patent: Jul. 28, 2009

(54) METHODS AND APPARATUS FOR A PAGING MECHANISM WITHIN WIRELESS NETWORKS INCLUDING MULTIPLE ACCESS POINTS

(75) Inventors: JR-Shian Tsai, Beaverton, OR (US); Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 477 days.

(21) Appl. No.: 11/435,302

(22) Filed: May 15, 2006

(65) Prior Publication Data

US 2007/0264955 A1    Nov. 15, 2007

(51) Int. Cl.
*H04B 1/18* (2006.01)
(52) U.S. Cl. .............. 455/186.1; 455/458; 455/502; 370/280; 370/331; 370/338
(58) Field of Classification Search ........ 455/502, 455/458, 436, 439, 438, 443; 370/280, 338, 370/331
See application file for complete search history.

(56) References Cited

U.S. PATENT DOCUMENTS

| | | | | |
|---|---|---|---|---|
| 5,123,008 A | * | 6/1992 | Beesley | 370/280 |
| 2002/0080759 A1 | * | 6/2002 | Harrington et al. | 370/338 |
| 2005/0002346 A1 | * | 1/2005 | Bichot | 370/312 |
| 2005/0232200 A1 | * | 10/2005 | Jeong et al. | 370/331 |
| 2006/0099972 A1 | * | 5/2006 | Nair et al. | 455/458 |
| 2007/0087767 A1 | * | 4/2007 | Pareek et al. | 455/502 |

OTHER PUBLICATIONS

International Search Report mailed on Oct. 16, 2007 for International Application No. PCT/US2007/068746, 6 pgs.
Liebsch et al., "Utilization of the IEEE802.11 power save mode with IP paging," Communications, 2005. ICC 2005. 2005 IEEE International Conference on, Publication Date: May 16-20, 2005, vol. 2, On pp. 1383-1389 vol. 2, ISBN: 0-7803-8938-7.
Sarikaya et al., "SIP paging of wireless LAN hosts for VoIP," Vehicular Technology Conference, 2005. VTC 2005-Spring. 2005 IEEE 61st, vol. 4, Issue, May 30-Jun. 1, 2005 pp. 2345-2348 vol. 4.

* cited by examiner

*Primary Examiner*—David Q Nguyen
(74) *Attorney, Agent, or Firm*—Schwabe, Williamson & Wyatt, P.C.

(57) ABSTRACT

Embodiments of the present invention provide methods and apparatus for a paging mechanism within wireless networks including multiple access points. Other embodiments may be described and claimed.

14 Claims, 11 Drawing Sheets

FIG. 11

METHODS AND APPARATUS FOR A PAGING MECHANISM WITHIN WIRELESS NETWORKS INCLUDING MULTIPLE ACCESS POINTS

TECHNICAL FIELD

Embodiments of the present invention relate to the field of wireless networks, and more particularly, to a paging mechanism within wireless networks including multiple access points.

BACKGROUND

The power saving mode for mobile devices defined by standards developed by special interest groups and/or standard development organizations, for example, the Institute of Electrical and Electronic Engineers (IEEE) is generally defined for operation within networks that include a single Access Point (AP) of coverage, meaning that this power saving mode does not work in the case of coverage in networks that include more than one AP. Re-association is needed across different APs and the power saving mode is designed for an active system in a low power operation mode, and not for a standby system. When mobile users carrying a mobile device travel from one AP to another AP, the mobile device will roam from one AP to another AP. Therefore, mobile devices conduct basic service set transition (BSS), or extended service set transition (ESS), even though there isn't any upcoming/outgoing traffic to/from a particular mobile device. In general, BSS transition involves scanning the available channels for the target AP, selecting the best AP, and re-association to a new AP. This unnecessary BSS transition may disrupt the total system idle, as well as unnecessary power consumption for doing re-association and scanning.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide methods and apparatus for a paging mechanism for a wireless network including multiple access points.

Figure 1:
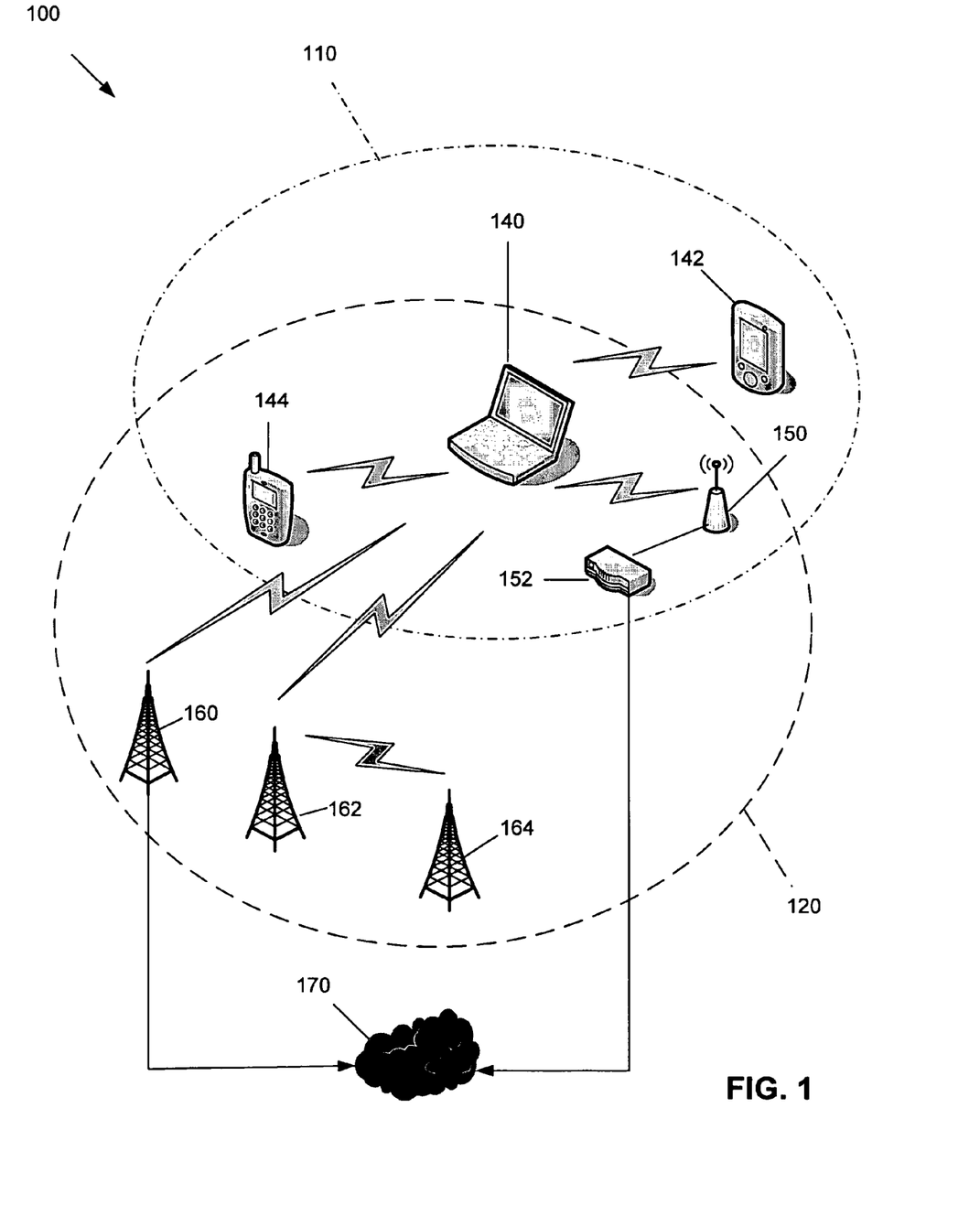
FIG. 1 is a schematic diagram representation of an example wireless communication system in accordance with various embodiments of the present invention.

Referring to FIG. 1, an example wireless communication system 100 may include one or more wireless communication networks, generally shown as 110 and 120. In particular, the wireless communication system 100 may include a wireless local area network (WLAN) 110, and a wireless metropolitan area network (WMAN) 120. Although FIG. 1 depicts two wireless communication networks, the wireless communication system 100 may include additional or fewer wireless communication networks. For example, the wireless communication network 100 may include more or less WLANs, and/or WMANs. The methods and apparatus described herein are not limited in this regard.

The wireless communication system 100 may also include one or more mobile devices, also referred to as subscriber stations, generally shown as 140, 142 and 144. For example, the subscriber stations 140, 142 and 144 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a global positioning satellite (GPS) device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts three subscriber stations, the wireless communication system 100 may include more or less subscriber stations.

The subscriber stations 140, 142 and 144 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links.

In one example, the laptop computer 140 may use direct sequence spread spectrum (DSSS) modulation and/or frequency hopping spread spectrum (FHSS) modulation to implement the WLAN 110 (e.g., modulations in accordance with any one of the 802.11 family of standards developed by the Institute of Electrical and Electronic Engineers (IEEE) and/or variations and evolutions of these standards). For example, the laptop computer 140 may communicate with devices associated with the WLAN 110 such as the handheld computer 142 and/or the smart phone 144 via wireless links. The laptop computer 140 may also communicate with an access point (AP) 150 via a wireless link. Generally, WLANs and WMANs include multiple APs 150. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 120. For example, the laptop computer 140 may operate in accordance with the 802.16 family of standards developed by IEEE to provide for fixed, portable, and/or mobile broadband wireless access (BWA) networks (e.g., the IEEE std. 802.16, published by IEEE 2004) to communicate with base stations, generally shown as 160, 162, and 164, via wireless link(s).

Although some of the above examples are described with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 110 and WMAN 120 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 110 may be operatively coupled to the common public or private network 170 via an AP 150 and/or the router 152. In another example, the WMAN 120 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards. Although FIG. 1 depicts a WLAN, and a WMAN, the wireless communication system 100 may include other combinations of WLANs, WMANs, and/or WWANs. The methods and apparatus described herein are not limited in this regard.

The wireless communication system 100 may include other WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

As will be described more fully herein, the present invention provides a paging mechanism for wireless networks that include multiple access points (APs). Generally, a station (STA) within the network enters a paging mode and does not associate with any AP while in the paging mode. More particularly, after the STA enters the paging mode, it is assumed within the network that the STA system will be idle and there is no activity. The STA "awakens" (exits the paging mode) prior to a paging interval (advertised, configured, or otherwise made known e.g. by a paging controller, and advertised by APs in the wireless network ) during which paging messages including paging indication messages (PIM) are transmitted, and is ready for being paged by the paging controller when there is incoming packets.

Figure 2:
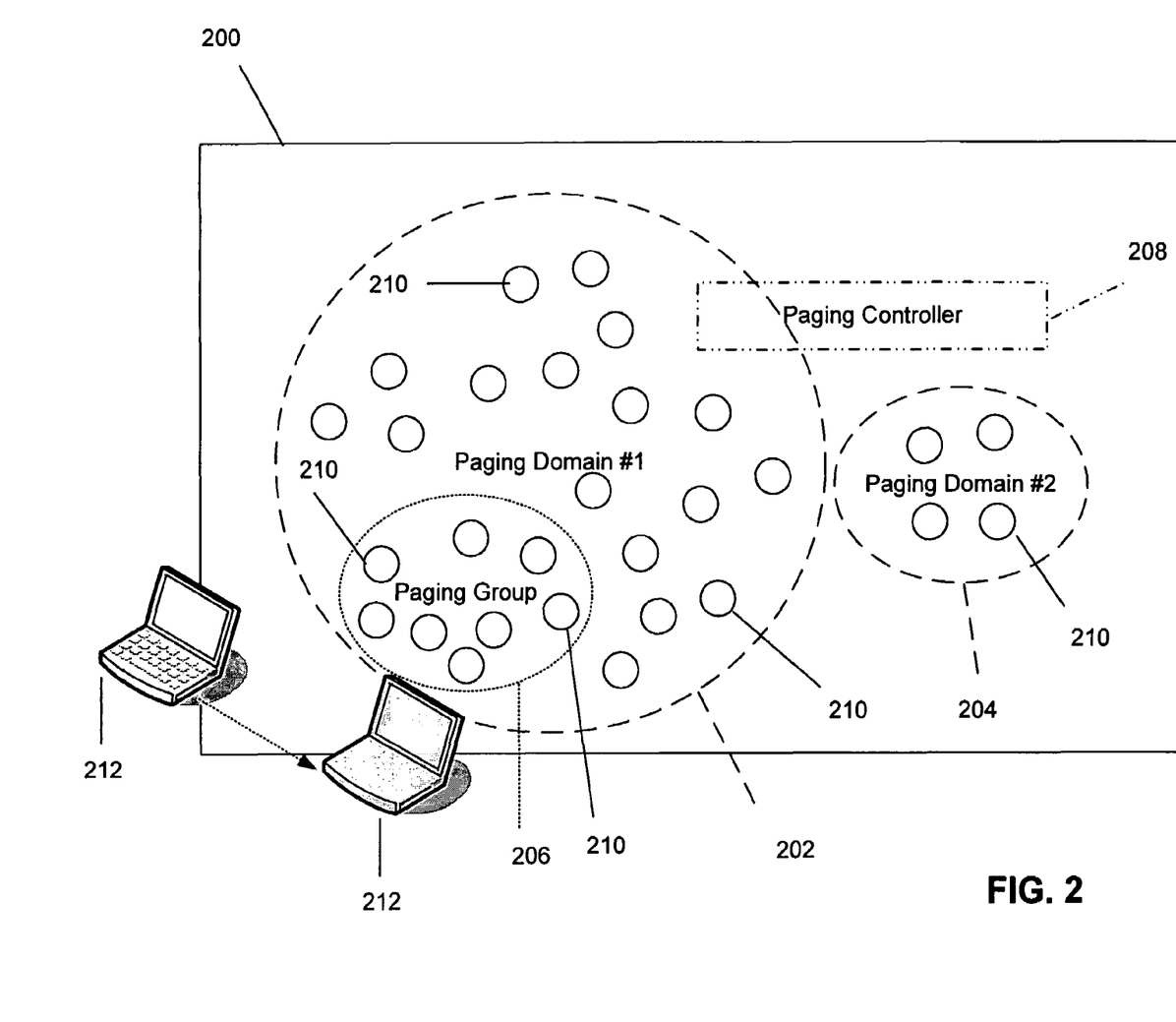
FIG. 2 is a schematic diagram representation of a paging architecture for a wireless network including multiple access points in accordance with various embodiments of the present invention.

Referring to FIG. 2, a paging architecture for a network 200 in accordance with various embodiments of the present invention is schematically illustrated. The paging architecture includes, for example, a first paging domain 202, a second paging domain 204, a paging group 206, and a paging controller 208.

The paging domain comprises one or more APs 210. The paging domain has a unique paging domain identification (ID), thereby allowing an STA 212 to identify the paging domain with which it is associated.

The paging group is within the paging domain and includes a list of APs that are near the STA. The paging group has a paging group ID (PG ID). In one exemplary embodiment of the present invention, the paging group is the same as the Neighbor Report defined in IEEE 802.11K (2004). In another exemplary embodiment, a paging group may also be statically configured by the wireless network designers based upon factors such as, for example, the scalability or geographic location of APs. A paging group may overlap multiple paging domains such that it is within one or more paging domain.

The paging controller is responsible for managing paging functionality such as location updates, and for responding to paging requests and/or broadcasting paging messages that include PIMs. The paging controller maybe co-located with a location server (such as GPS) and/or a wireless router that is capable of buffering incoming packets and configuring a paging message from the paging controller.

A paging protocol is defined in accordance with various embodiments of the present invention. The paging protocol provides messages that enable a paging mechanism in a wireless network that includes multiple access points. Examples of various messages include paging discovery messages, paging registration messages, configuration messages, presence update messages, paging command messages, paging messages and PIMs.

A paging proxy is also defined in accordance with various embodiments of the present invention. The paging proxy is responsible for relaying paging protocol messages between the paging controller and STA. The paging proxy is also responsible for buffering incoming packets for the STA when it is in a paging mode, and triggering a PIM from the paging controller for a given STA.

An access point and STA each comprise an omnidirectional antenna, a control block, a transmit block operatively coupled to the control block and antenna, and a receive block operatively coupled to the control block and antenna. At least the transmit block and receive block may be part of a transceiver having at least one common component. Within at least the STA, the transmit and receive blocks comprise components implementing a medium access control (MAC) layer and a Physical (PHY) layer of a communication model. The STA may enter and exit a paging mode by the control block powering at least some or all of the components implementing the MAC and/or PHY layers off and on.

Figure 3:
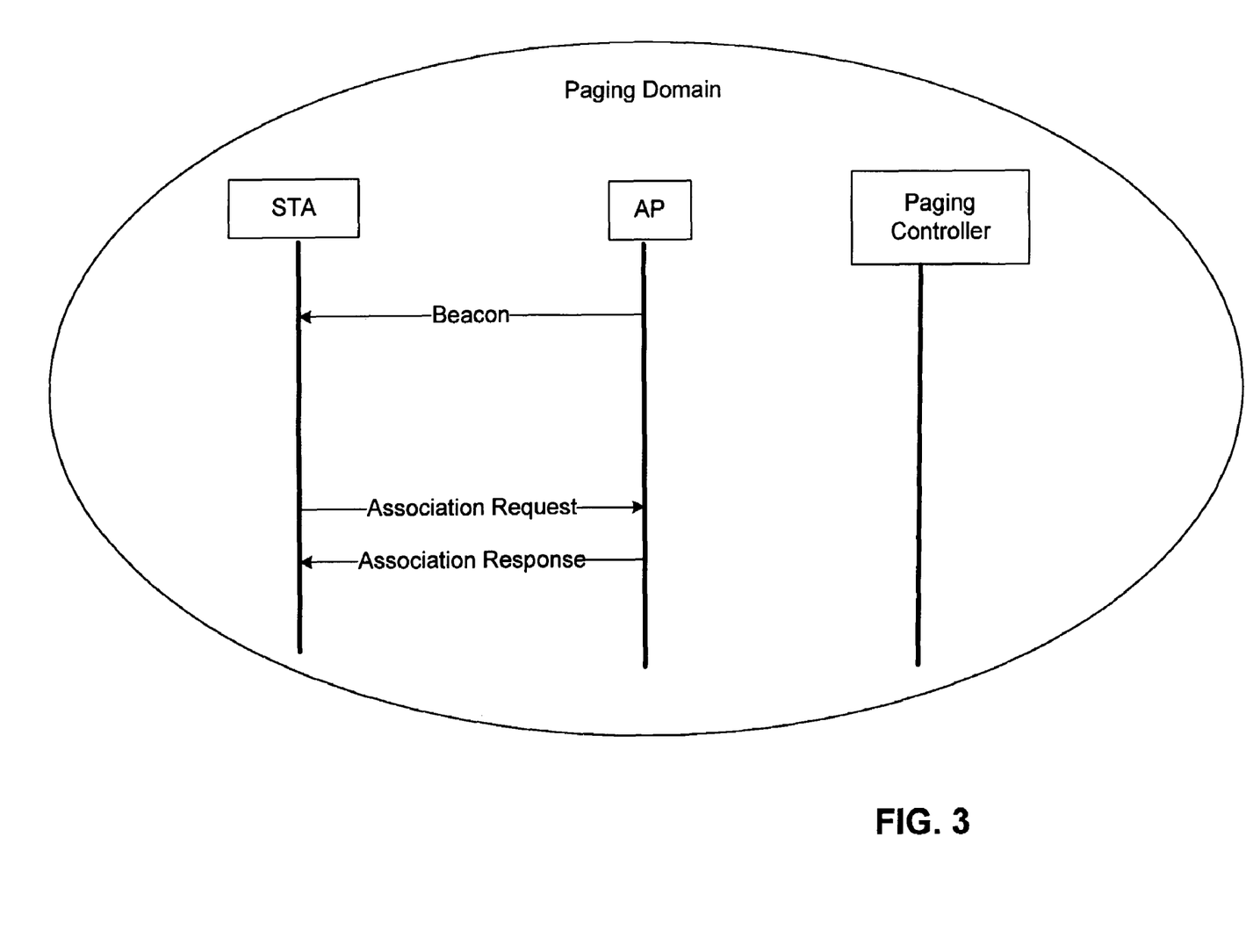
FIGS. 3-7 are schematic diagram representations for various examples of message flow within a paging architecture for a wireless network including multiple access points in accordance with various embodiments of the present invention.

Referring to FIG. 3, an example of paging discovery messages and the message exchange flow, in accordance with various embodiments of the present invention, may be described. An STA enters a network including at least one paging domain and receives beacons from one or more APs within a paging domain. These beacons may include the paging controller ID, for example, and may also include information relating to the paging interval, for example. The paging interval is a predetermined time interval during which paging messages are sent. The STA transmits an association request to a selected AP and the AP responds confirming association. The confirming may be without authentication for eligibility or with authentication. Authentication may be performed in a variety of manners with or without use of third parties. Thereafter, the STA is now associated with this particular paging domain and the AP is now the AP paging proxy.

Figure 4:
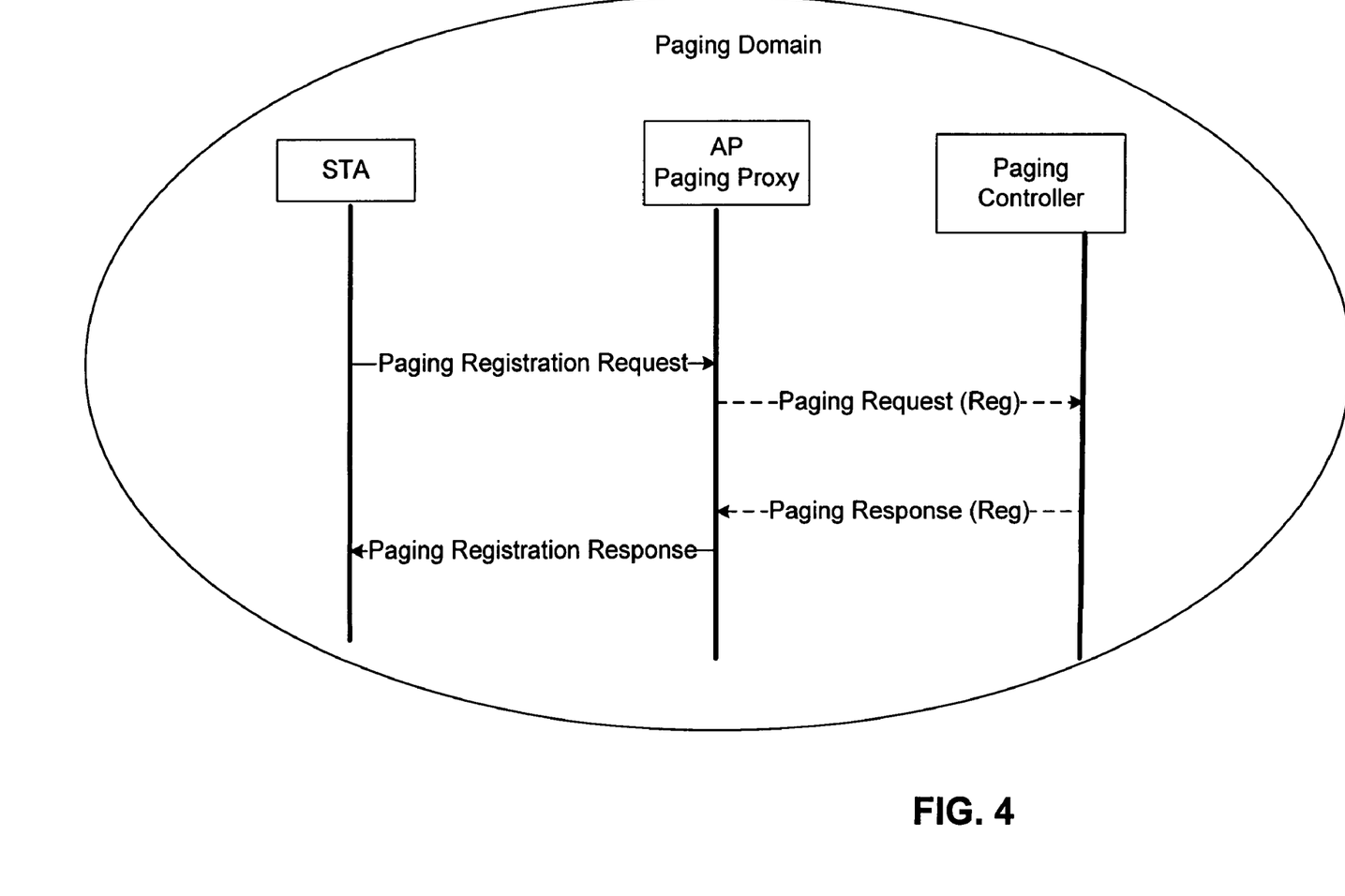

Referring to FIG. 4, an example of registration messages and their transmission, in accordance with various embodiments of the present invention, may be described. A registration message is used by the STA to acquire paging key information, for securing paging messages, and paging interval information, if not previously provided. The AP paging proxy receives the registration message and exchanges this information with the paging controller after a successful association or re-association of the STA with the AP paging proxy. Thus, the STA sends a registration message requesting paging registration to the AP paging proxy, which forwards it to the paging controller. The paging controller sends a paging response message back to the AP paging proxy, which forwards it to the STA. The STA is now registered with the paging controller for paging service. The STA may configure a paging context that may include, for example, the paging domain key, the PG ID, the paging domain ID, and/or paging interval. The STA may configure the paging context via one or more registration messages exchanged with the AP paging proxy.

Figure 5:
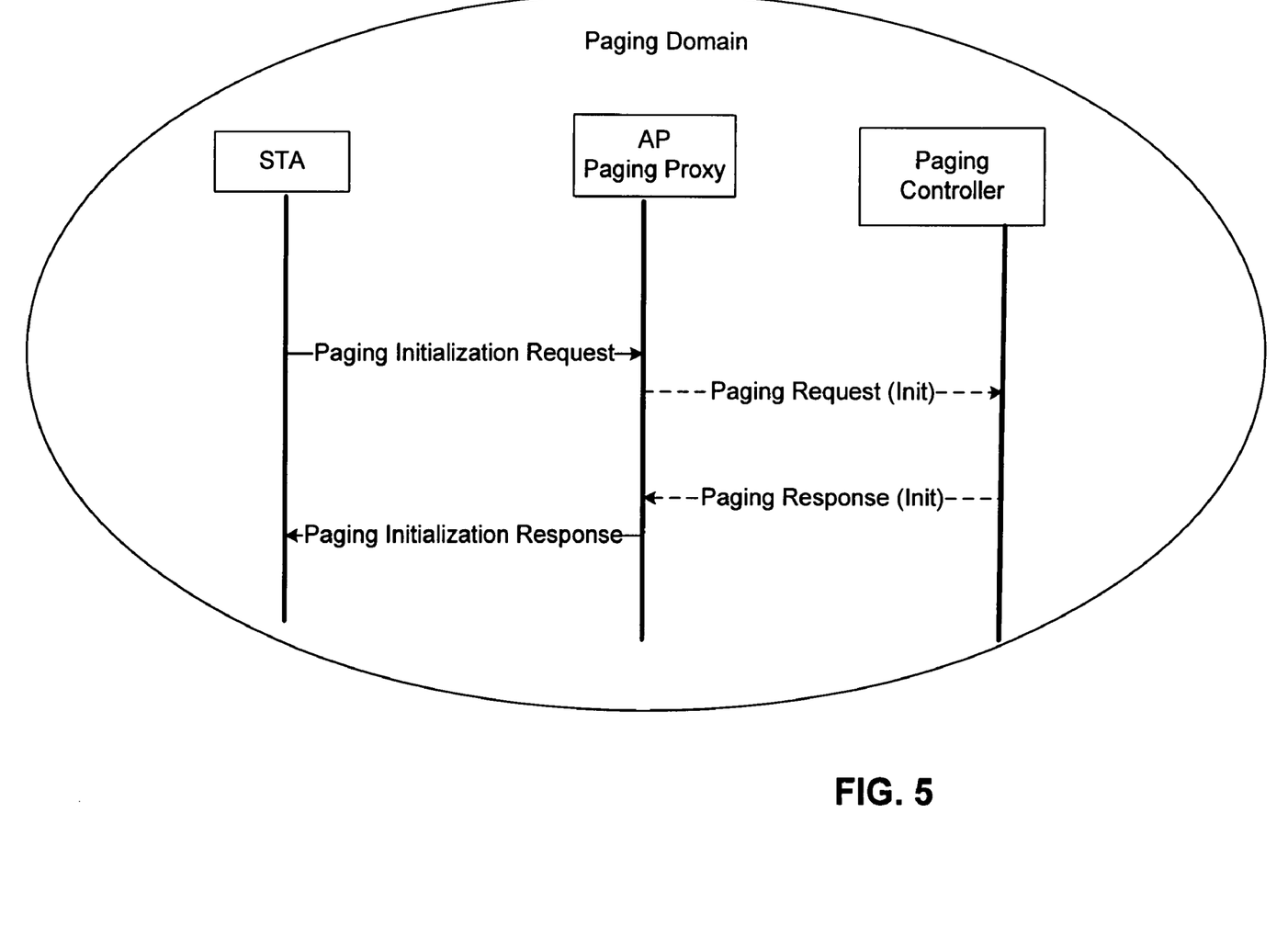
Figure 6:
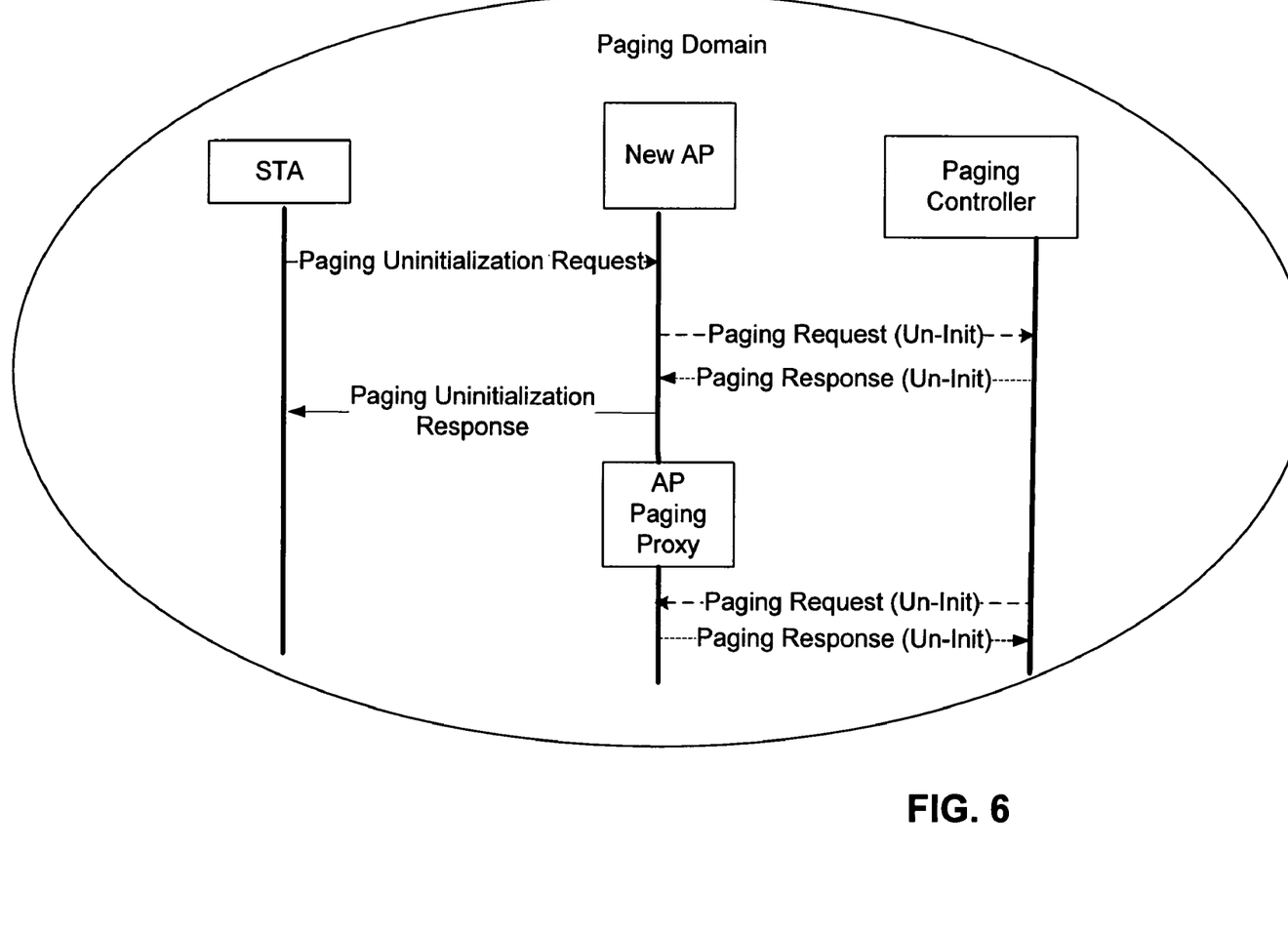

Referring to FIGS. 5 and 6, an example of initialization/un-initialization messages and the message exchange flow, in accordance with various embodiments of the present invention, may be described. An initialization message is used by the STA to inform the AP paging proxy of its wish to enter the paging mode. After the AP paging proxy receives the initialization message from the STA, the AP paging proxy changes the STA's state from whichever mode (e.g. active mode) the STA is in to the paging mode. Then, the AP paging proxy forwards the initialization message to the paging controller. The paging controller sends a paging response message back to the AP paging proxy, which forwards it to the STA. The STA is now allowed to enter the paging mode.

Upon exiting the paging mode, if the AP the STA detects is different from its AP paging proxy, the STA first associates with a new AP (which may be the one detected or may be a different one depending upon the criteria used by the STA for selecting an AP), then sends an un-initialization message to the newly associated AP, which exchanges the un-initialization message with the paging controller. Before the paging controller sends a paging response back to the STA's newly associated AP, the paging controller instructs the old AP paging proxy to remove the STA from its STA list.

Figure 7:
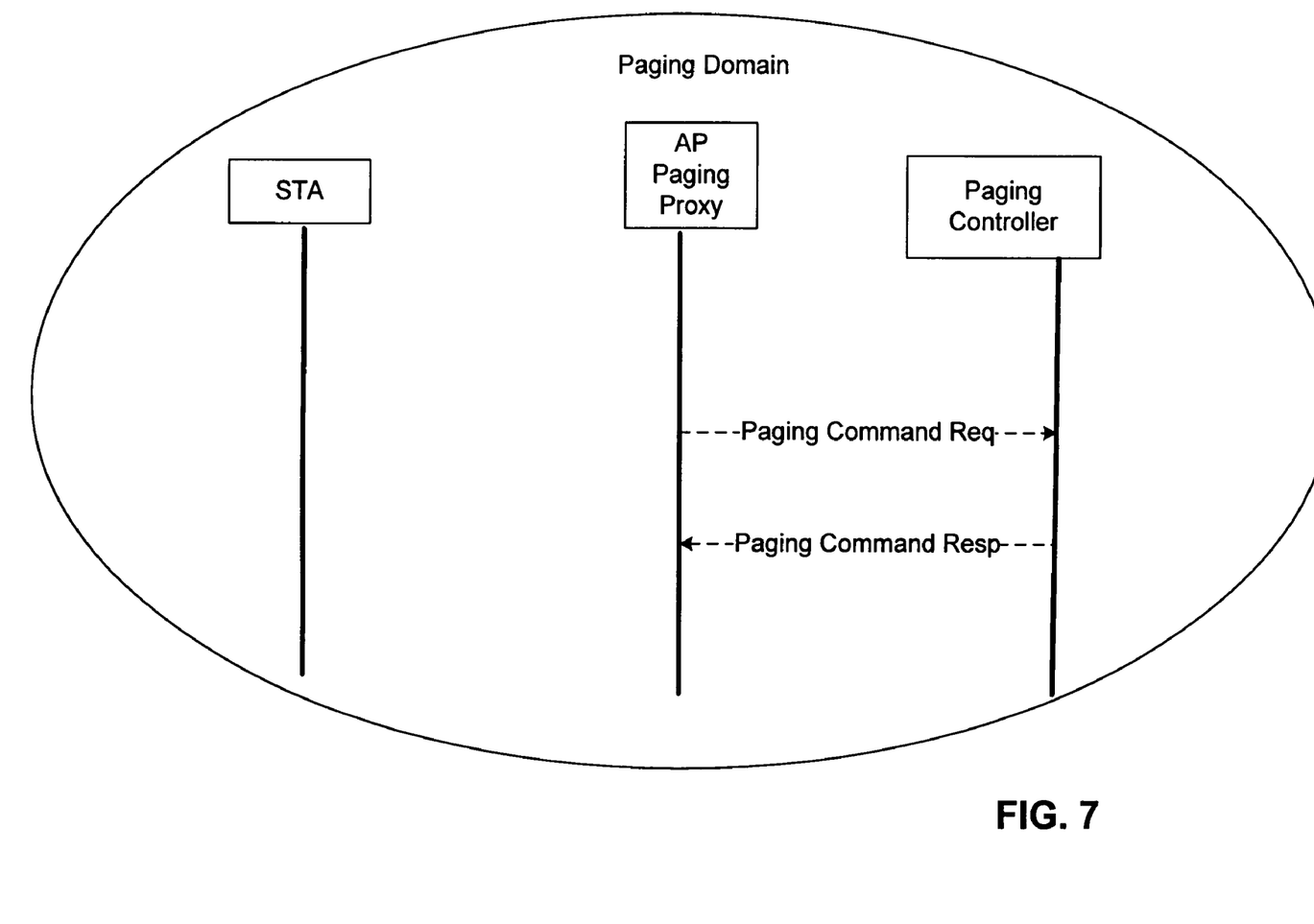

Referring to FIG. 7, an exemplary flow of messaging for paging command messages, in accordance with various embodiments of the present invention, may be described. The paging command messages are used by the AP paging proxy. The AP paging proxy uses the messages to query the paging controller for a given STA's paging status. The AP paging proxy may also send a paging command message to trigger a paging message to be sent to the STA from the paging controller to page the STA. For example, if the STA has exited the paging mode and wishes to see if it has been paged without waiting for the next paging interval, the AP proxy may send a paging command message.

Figure 8:
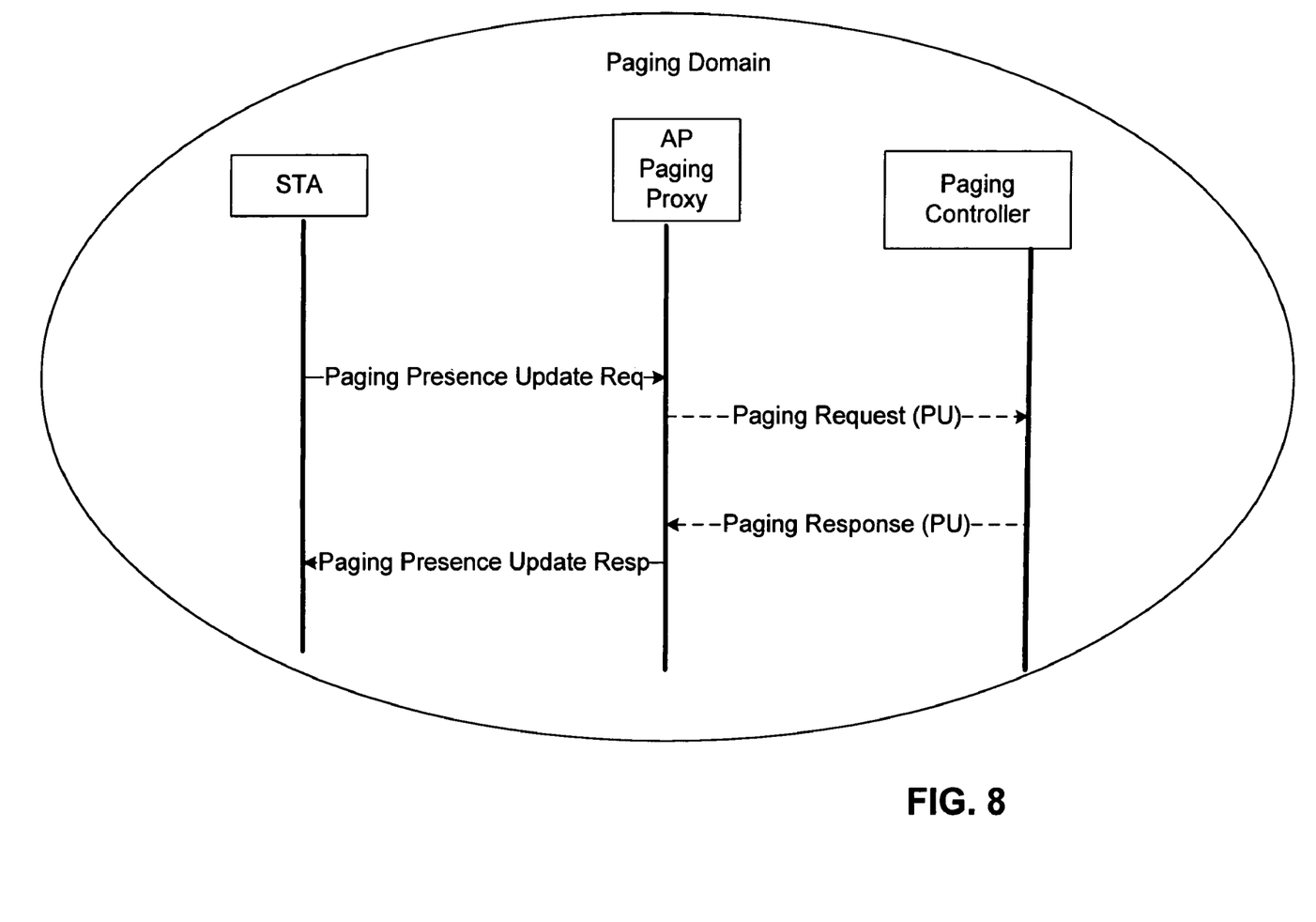
FIG. 8 is a flowchart illustrating an example of operation of a paging architecture for a wireless network including multiple access points in accordance with various embodiments of the present invention.

Referring to FIG. 8, an example of presence update messages and the message exchange flow, in accordance with various embodiments of the present invention, may be described. The STA uses such a message to inform the paging controller regarding its current BSS ID or BSS ID set (a list of APs in the neighbor report). The STA may, for example, send a presence update message when it determines that a current PG ID is different from the previous PG ID, thereby indicating that the STA has moved and is within a new paging group and/or a new paging domain or even a new network. The STA associates with a new AP and reconfigures its paging context (keying material and paging controller ID, if the paging controller ID has also changed). In accordance with one embodiment of the present invention, the paging controller maintains a presence update timer associated with the STA. If the STA does not update its location with the paging controller within a predetermined amount of time, the paging controller will remove the STA from its paging STA list and instruct the AP paging proxy to remove the STA from its idle mode STA list, as it will assume that the STA has left the paging domain or domains controlled by the paging controller.

Figure 9:
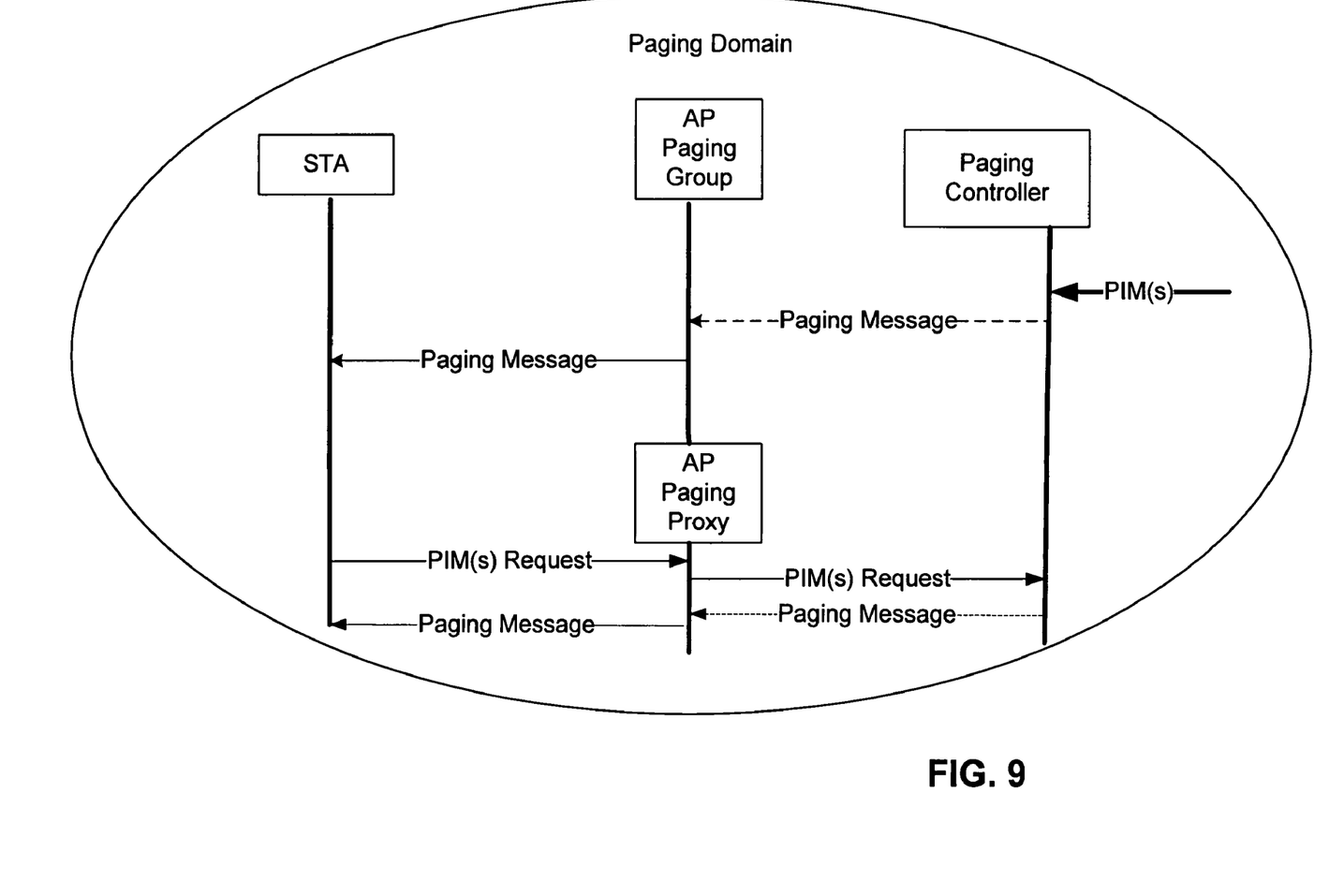
FIG. 9 is a block diagram representation of an example processor system that may be used to practice various aspects of the present invention.

Referring to FIG. 9, an example of paging messages and the message exchange flow, in accordance with various embodiments of the present invention, may be described. Paging messages are sent from the paging controller to an AP or a set of APs within a paging group during each paging interval. Each paging message may contain zero or more PIMs within a packet. A PIM contains the STA identification (e.g., MAC address), paging type and other paging-necessary information for the STA. If there is more than one PIM for the STA within a paging interval, the paging controller packs all the PIMs with their respective arrival order in one paging message. The paging message is encrypted with an individual STA paging key.

Once an STA enters the paging mode, the STA may temporarily or partially exit the paging mode prior to each paging interval, or prior to a paging interval after more than one paging interval has passed, to receive paging messages. The exit may be automatic or may be triggered by a user. The STA checks the paging message from the AP(s), if any, for any PIMs and decrypts the PIMs to determine if it indeed has been or is being paged. If the paging message does not include any PIM(s) for the STA, indicating that the STA has not been paged, it may re-enter the paging mode. If however the paging message includes any PIM(s) for the STA, thereby indicating that the STA has indeed been paged, the STA may re-associate with the AP paging proxy if the STA has not moved enough to warrant a change. Alternatively, the STA may associate with a new AP, a new paging domain if needed, and even a new paging controller if needed.

Figure 10:
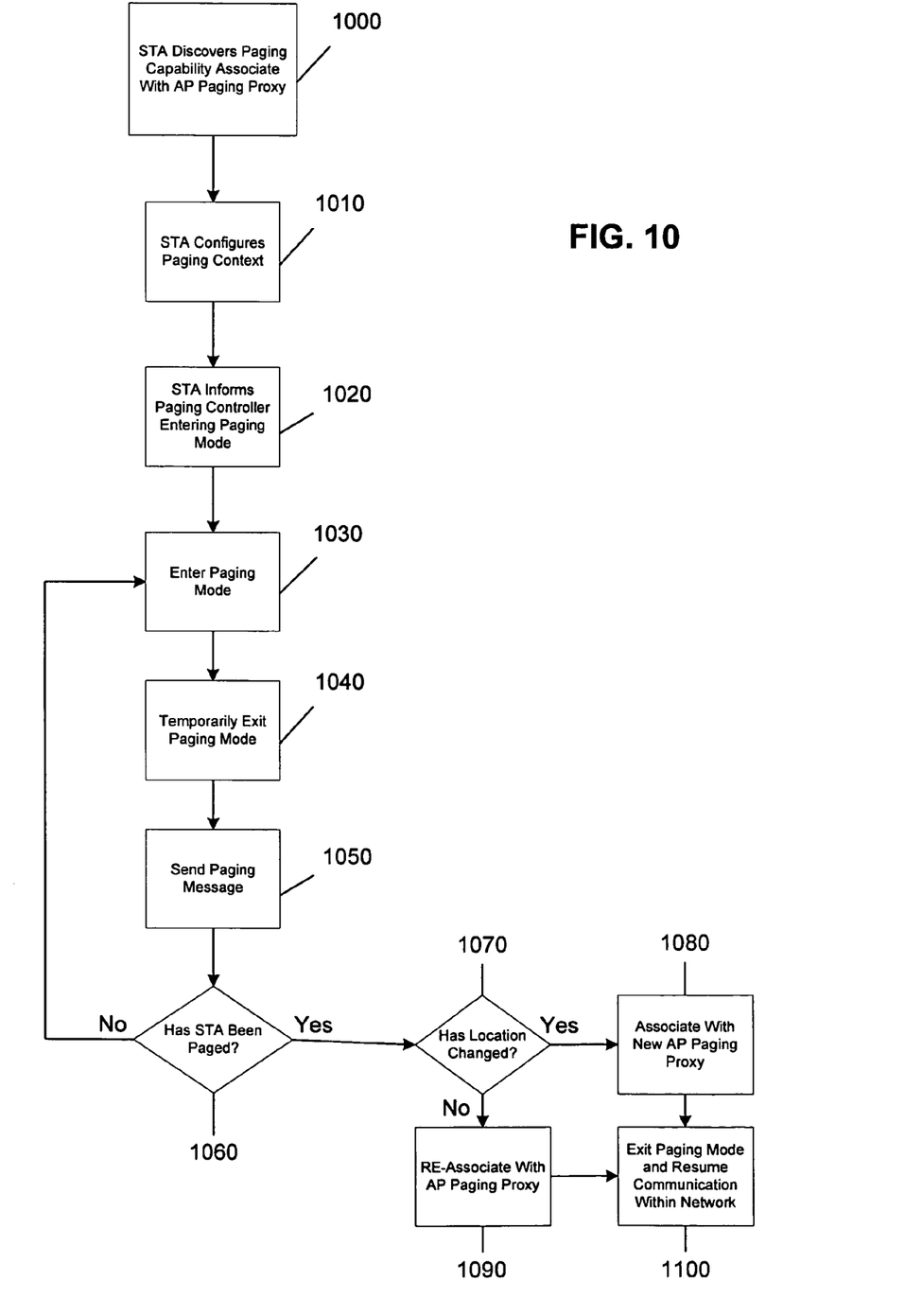
FIG. 10 is an exemplary operation for a paging mechanism in accordance with various embodiments.

Thus, with reference to FIG. 10, an exemplary operation for a paging mechanism, in accordance with various embodiments of the present invention, may include, at block 1000 an STA discovering, during a network entry procedure for the STA, that the wireless network supports the paging mechanism by receiving beacons, for example, from one or more APs. The STA associates with a paging domain and AR paging proxy. At block 1010, the STA may configure a paging context (paging domain key, PG ID, paging domain ID, and/or paging interval). The STA may configure the paging context via one or more registration messages exchanged with an AP and associates with a paging domain and an AP paging proxy, which is part of a paging group. The STA may decide to enter a paging mode and may inform the paging controller, via the AP paging proxy, by either sending a registration message or a presence update message at block 1020. Upon receiving an acknowledgement back from the paging controller, via the AP paging proxy, the STA enters the paging mode at block 1030. Generally, this includes powering off its MAC layer and PHY layer. When paging is needed, the paging controller determines the paging group through which the STA may be paged based upon the STA's last known location. The STA temporarily or partially exits the paging mode prior to the paging interval at block 1040. The paging controller sends a paging message to at least one AP of the list of paging group APs at block 1050. The paging group APs relay and broadcast the paging messages during the paging interval and the STA receives. The STA checks the paging message for any PIMs and decrypts them to see whether there are any PIM(s) intended for it indicating that it has indeed been paged at block 1060. As noted at blocks 1070-1100, if the STA has been paged, the STA re-associates with an AP, either the original AP paging proxy if the STA hasn't moved enough to warrant a change or with a new AP, exits the paging mode and resumes communication within the network. If it hasn't been paged, it may re-enter the paging mode.

Figure 11:
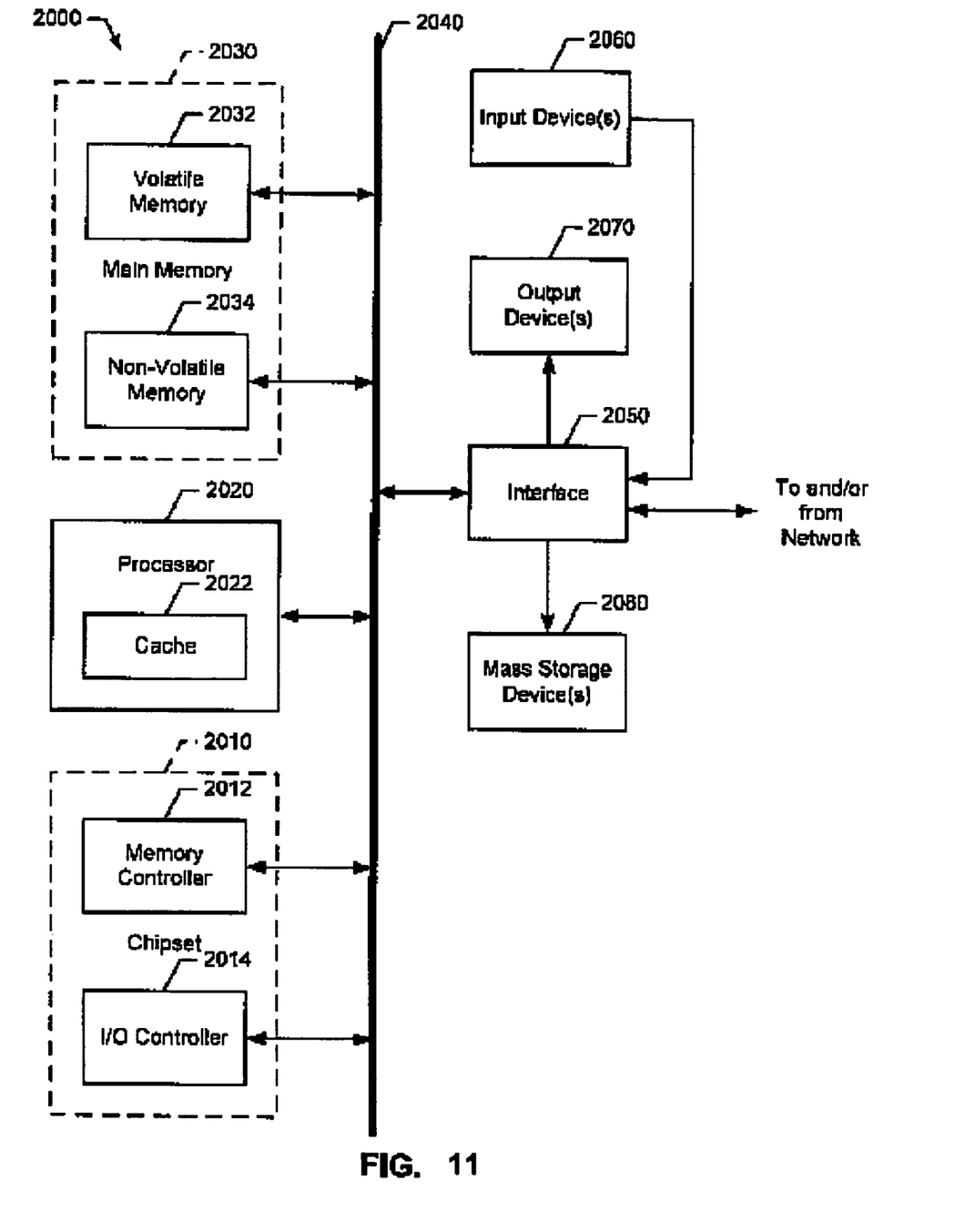
FIG. 11 is block diagram of an example processor system in accordance with various embodiments.

FIG. 11 is a block diagram of an example processor system 2000 adapted to implement the methods and apparatus disclosed herein, in accordance with various embodiments. The processor system 2000 may be a desktop computer, a laptop computer, a handheld computer, a tablet computer, a PDA, a server, an Internet appliance, and/or any other type of computing device. The processor system 2000 may be used as a STA, an AP, or a server hosting the paging controller function.

The processor system 2000 illustrated in FIG. 11 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The chipset 2010 may be implemented using one or more Wireless Personal Area Network (WPAN) components, Wireless Local Area Network (WLAN) components, Wireless Metropolitan Area Network (WMAN) components, Wireless Wide Area Network (WWAN) components, and/or other suitable networking components. In particular, in various embodiments designed to be a STA or an AP, the chipset 2010 may be endowed with the teachings of the present invention, implementing selected aspects of the above described paging mechanism. The processor 2020 may be implemented using one or more processors, e.g. those of the Intel® Core™ technology, Intel® Pentium® technology, the Intel® Itanium® technology, the Intel® Centrino™ technology, the Intel® Core™ Duo technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device. In various embodiments designed to be used as a server, suitable for hosting the above described paging controller function, main memory 2030 may include (a non-persistent copy of the) instructions implementing all or portions of the above described paging controller function.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface. In various embodiments designed to be a STA or AP, selected aspects of the above described paging mechanism may be implemented in interface circuit 2050, in addition to or in lieu of the endowment in chipset 2010.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives. In various embodiments designed to be used as a server, suitable for hosting the above described paging controller function, mass storage device(s) may include (a non-persistent copy of the) instructions implementing all or portions of the above described paging controller function.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 11 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A system comprising:
   an omnidirectional antenna;
   a control block adapted to determine whether a network comprising a plurality of access points (APs) supports a paging function, and if the network does support a paging function, to associate with a paging domain comprising at least one AP;
   a transmit block operatively coupled to the antenna and to the control block and adapted to transmit a request for paging to one of the at least one APs; and
   a receiver block operatively coupled to the antenna and to the control block and adapted to receive an acknowledgment from the AP having received the paging request, and to receive a paging message including zero or more paging indication messages (PIM) during a paging interval from one or more APs within a paging group of the paging domain;
   wherein the transmit and receive blocks comprise components implementing a medium access control (MAC) layer and a physical (PHY) layer of a communication model, and the control block is further adapted to enter a paging mode by powering off the components implementing the MAC and PHY layers.

2. The system of claim 1, wherein at least the transmit and receive blocks are part of a transceiver having at least one common component.

3. The system of claim 1, wherein the control block is further adapted to create a paging context comprising at least one of a paging domain identification (ID), a paging capability indicator, a duration of the paging interval, or a paging domain key.

4. The system of claim 3, wherein the control block is further adapted to create a registration message including at least some of the paging context, and to control the transmit block to transmit the registration message to an AP within the paging group.

5. The system of claim 1, wherein the control block is further adapted to cause the transmit block to transmit current location information of a station (STA) to an AP and to associate the STA with another AP depending upon the current location information.

6. The system of claim 5, wherein the control block is further adapted to associate the STA with another AP of a different paging group and/or different paging domain depending upon the current location information.

7. A system comprising:
   an omnidirectional antenna;
   a control block adapted to determine whether a network comprising a plurality of access points (APs) supports a paging function, and if the network does support a paging function, to associate with a paging domain comprising at least one AP;
   a transmit block operatively coupled to the antenna and to the control block and adapted to transmit a request for paging to one of the at least one APs; and
   a receiver block operatively coupled to the antenna and to the control block and adapted to receive an acknowledgment from the AP having received the paging request, and to receive a paging message including zero or more paging indication messages (PIM) during a paging interval from one or more APs within a paging group of the paging domain;
   wherein the control block is further adapted to cause the transmit block to transmit current location information of a station (STA) to an AP and to associate the STA with another AP depending upon the current location information.

8. The system of claim 7, wherein at least the transmit and receive blocks are part of a transceiver having at least one common component.

9. The system of claim 7, wherein the control block is further adapted to create a paging context comprising at least one of a paging domain identification (ID), a paging capability indicator, a duration of the paging interval, or a paging domain key.

10. The system of claim 9, wherein the control block is further adapted to create a registration message including at least some of the paging context, and to control the transmit block to transmit the registration message to an AP within the paging group.

11. The system of claim 7, wherein the control block is further adapted to associate the STA with another AP of a different paging group and/or different paging domain depending upon the current location information.

12. A method comprising:
- determining whether a network comprising a plurality of access points (APs) supports a paging function;
- associating a station (STA) with a paging domain comprising at least one AP, if the network does support a paging function;
- transmitting a request for paging to one of the at least one APs;
- receiving an acknowledgment from the AP having received the paging request;
- receiving a paging message including zero or more paging indication messages (PIM) during a paging interval from one or more APs within a paging group of the paging domain; and
- entering a paging mode by powering off components of a communication model implementing a medium access control (MAC) layer and a physical (PHY) layer of an apparatus included within the STA.

13. The method of claim 12, further comprising creating a paging context comprising at least one of a paging domain identification (ID), a paging capability indicator, a duration of the paging interval, or a paging domain key, creating a registration message including at least some of the paging context, and transmiting the registration message to an AP within the paging group.

14. The method of claim 12, further comprising transmitting current location information of the STA to an AP and associating the STA with another AP depending upon the current location information.

* * * * *